Nov. 18, 1969   W. W. KANIUKA   3,478,990
APPARATUS FOR RESISTING CONTROL STICK DEFLECTION
Filed Oct. 31, 1967                               2 Sheets-Sheet 1
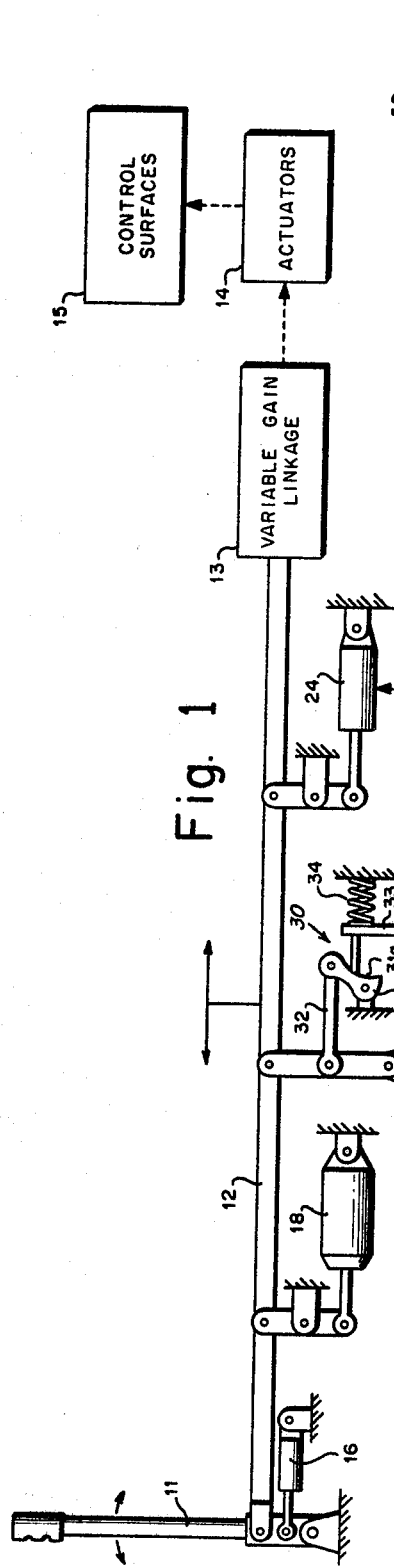
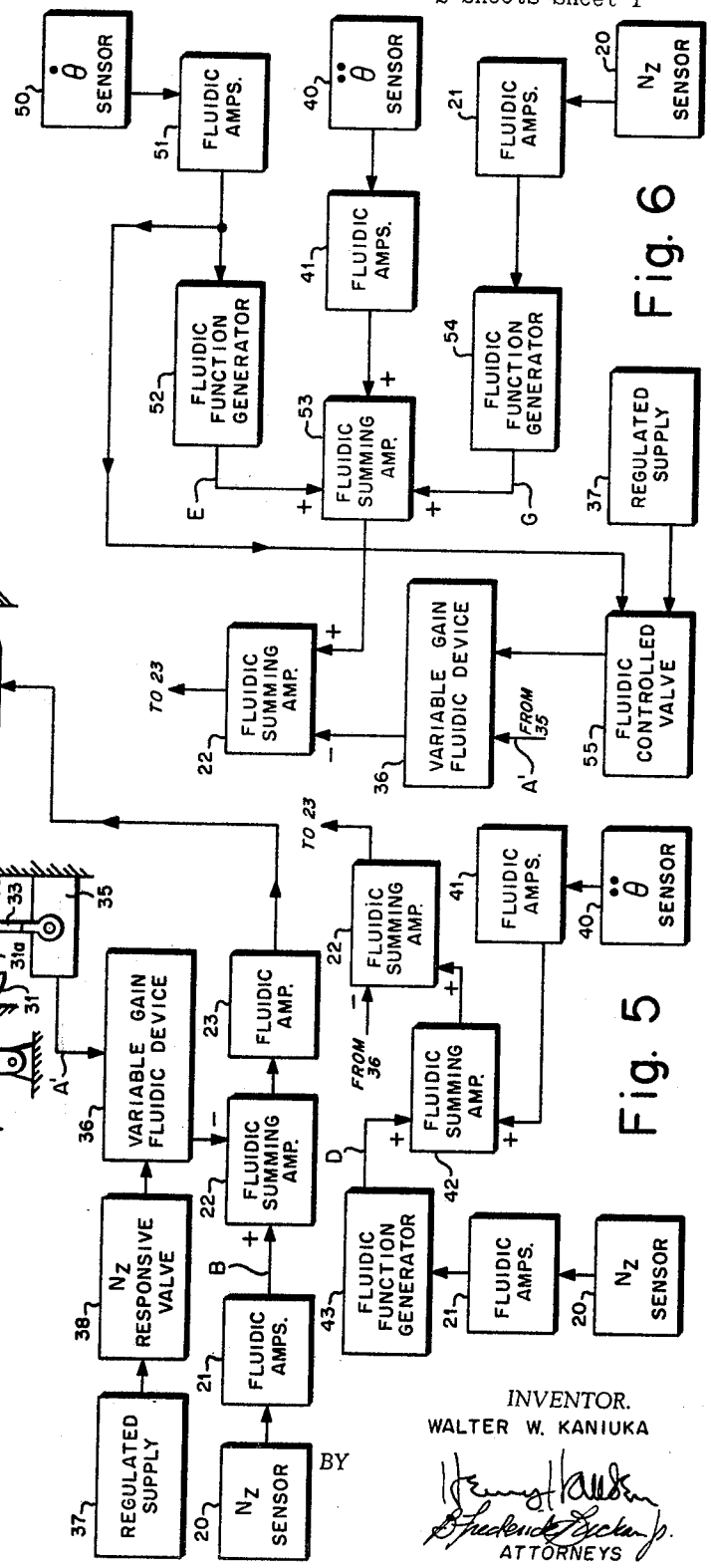
INVENTOR.
WALTER W. KANIUKA
ATTORNEYS

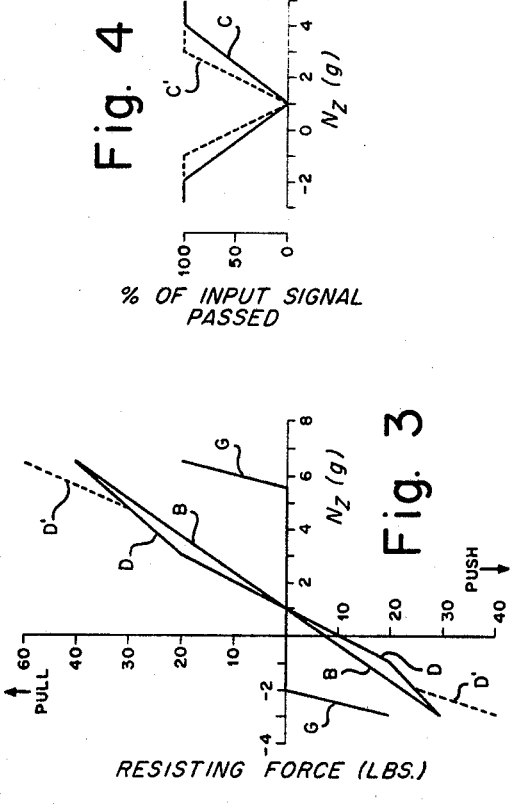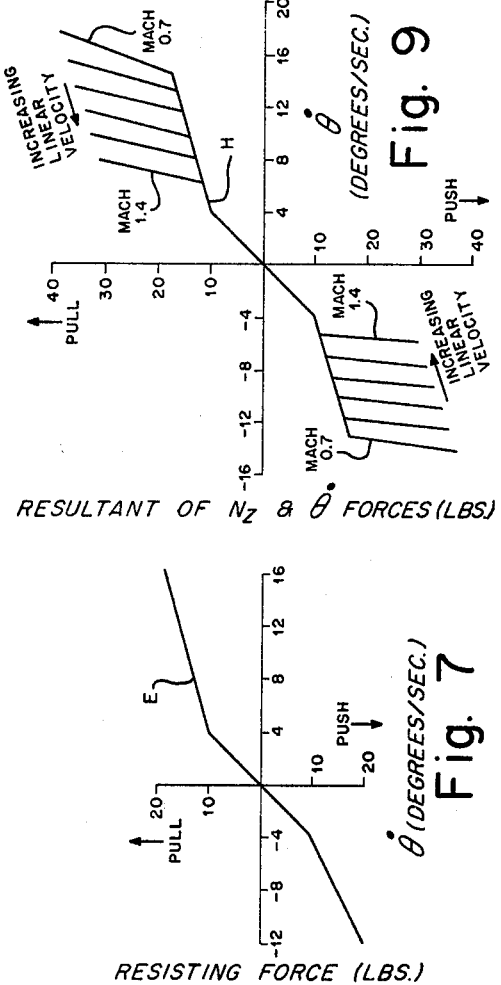

United States Patent Office 3,478,990
Patented Nov. 18, 1969

3,478,990
APPARATUS FOR RESISTING CONTROL
STICK DEFLECTION
Walter W. Kaniuka, Philadelphia, Pa., assignor to the
United States of America as represented by the Secretary of the Navy
Filed Oct. 31, 1967, Ser. No. 679,343
Int. Cl. B64c 13/36, 13/46
U.S. Cl. 244—85                                    17 Claims

ABSTRACT OF THE DISCLOSURE

Apparatus for an aircraft and responsive to normal acceleration and also, in some embodiments, to pitching angular velocity and/or pitching angular acceleration for providing predetermined resistance to deflection of an aircraft control stick. The apparatus includes a spring-actuated first force producer, a device providing a first fluidic signal indicative of the force imposed by the first force producer and a second force producer responsive to a fluidic signal which is the difference between the first fluidic signal as partially inhibited by the existing condition of either normal acceleration or pitching angular velocity and an opposed second fluidic signal which is indicative of additional desired resistive force produced in response to a combination of the existing conditions of some or all of normal acceleration, pitching angular velocity and pitching angular acceleration.

---

The invention described herein may be manufactured and used by or for the Government of the United States of America for governmental purposes without the payment of any royalties thereon or therefor.

BACKGROUND OF INVENTION

The use of powered actuators responsive to the control stick for deflecting aircraft control surfaces has necessitated the inclusion of some sort of apparatus to provide resistance under varying flight conditions to deflection of the control stick. Many known aircraft control systems include spring-powered actuators and appropriately positioned bobweights for creating forces resisting control stick deflection in response to normal acceleration and pitching angular acceleration. Bobweights are heavy, take up valuable space, and are not well adapted for use with high-performance aircraft. Some control systems have been devised which include hydraulic devices responsive to normal acceleration and pitching angular acceleration for providing linear force cues which resist control stick deflection. Such systems appear to be unsatisfactory in that little provision is made for generating desirable resistive forces under conditions of small pitching angular acceleration and/or small normal acceleration. Further, known systems exhibit over an entire anticipated flight regime an unsatisfactory tendency to provide varying stick deflection resisting forces at given conditions of acceleration. An effective control system for high performance aircraft should exhibit substantially the same characteristics over the entire flight regime contemplated, should provide a warning to the pilot that the structural stress limits of the aircraft are being approached and, also, should provide sufficiently great forces to resist small stick deflections for enabling more precise corrections in pitch or roll attitude during normal flight, and, further, during times when it is desired to bring weapons to bear on a target.

SUMMARY OF INVENTION

The general purpose of this invention is to provide an improved apparatus for applying delection resisting forces to an aircraft control stick which apparatus is well adapted for use with the control systems of high performance aircraft. Briefly, the general purpose of the invention and other objects which may hereinafter become more apparent are accomplished by providing a device for providing a first fluidic signal representing the degree of force being imposed upon the control stick by a spring-actuated force producer and by providing fluidic apparatus which is responsive to the first fluidic signal and to normal acceleration and, in a narrower sense, to angular acceleration and/or angular velocity for generating a predetermined fluidic force signal which actuates a fluidic force producer connected to the control stick. The first fluidic signal is fed to a fluidic network responsive to normal acceleration or to pitching angular velocity and, as modified thereby, is fed to a fluidic summing amplifier in opposition to the above indicated, predetermined fluidic force signal. Thereby, varying predetermined degrees of deflection resisting force are applied to the control stick by both the spring-actuated and the fluidic-actuated force producers in accordance with the particular combination of existing flight conditions.

BRIEF DESCRIPTION OF DRAWING

FIG. 1 represents a block and schematic diagram of an aircraft control system including apparatus according to the invention responsive to normal acceleration;

FIG. 2 represents a typical diagram of the force provided by a feel spring strut at various stick deflections;

FIG. 3 represents a diagram of a plurality of predetermined resistive forces under various conditions of normal acceleration to be produced in the apparatus of FIG. 1 and in first and second modifications thereof;

FIG. 4 represents a diagram of the percentage of a force signal passed at various conditions of normal acceleration by a gain change device included in the apparatus of FIG. 1 and in a first modification thereof;

FIG. 5 represents a block and schematic diagram of a first modification of the apparatus of FIG. 1 which is further responsive to pitching angular acceleration;

FIG. 6 represents a block and schematic diagram of a second modification of the apparatus of FIG. 1 which is further responsive to pitching angular acceleration and to pitching angular velocity;

FIG. 7 represents a diagram of a predetermined resistive force to be provided in response to pitching angular velocity for the apparatus of FIG. 6;

FIG. 8 represents a diagram of the percentage of inhibit signal passed at various conditions of pitching angular velocity by a gain change device in the apparatus of FIG. 6; and FIG. 9 represents a diagram of a family of curves indicative of a resultant resistive force at various pitching angular velocities over a range of linear aircraft velocities.

DESCRIPTION OF PREFERRED EMBODIMENTS

As shown in FIG. 1, the aircraft control system includes a conventional control stick 11 to which is pivotally connected one end of an actuator rod 12 whose other end is connected to a variable gain linkage 13 which, in turn, causes conventional hydraulic actuators 14 to position the appropriate control surfaces 15 of the aircraft in accordance with the particular deflection of the control stick 11 from a null position. The system also includes a conventional viscous damper 16 connected to the control stick 11. A feel spring strut 18 is connected to the rod 12, tends to center the stick 11 and provides a force to resist control stick deflection from a null position preferably in accordance with the force diagram of FIG. 2. Curve A of the force diagram of FIG. 2 indicates, for example, that the degree of force required to effect stick deflections in an F-8 aircraft increases from a preloading of 3 lbs. to 7.6 resisting pull and 6 lbs. resisting push at certain predetermined positive and negative stick deflections such as 0.3 and 0.2 inch and thereafter increases at a lesser rate to 20 lbs. at a rearward deflection of 5 inches or to 11.5 lbs. at a forward deflection of 3 inches. This S-shaped characteristic enables the pilot to more effectively control small but necessary variations in the attitude of the aircraft relative to horizontal as during land maneuvers.

In order to provide a warning to the pilot that the aircraft could be stressed beyond its structural limits during a particular maneuver directed by the control stick 11, a fluidic sensor 20 is included which provides a fluidic output signal preferably in differential pressure form and indicative of the normal acceleration, $N_z$. Suitable acceleration sensors are known in the art. The fluidic output signal from the sensor 20 is amplified by a cascade of fluidic amplifiers 31 which provides a properly scaled fluidic signal indicative of a desired additional deflection resisting force to be imposed in response to $N_z$. For example, as shown in FIG. 3, the curve B varies linearly with changing $N_z$ from a desired force of zero at plus one gravitational constant, $g$, the curve preferably having a slope of about 7.4 lbs. per $g$ for an F-8 aircraft. The output force signal from the fluidic amplifiers 21 is fed to a fluidic summing amplifier 22 whose output signal, in turn, is fed to another fluidic amplifier 23 which provides a fluidic force signal to control a pneumatic force producer 24. The force producer 24 is connected to the rod 12 and is arranged to impose the additional deflection resisting force commanded by the controlling fluidic force signal.

If the linear deflection resisting $N_z$ force were merely to be added to the force provided by the spring strut 18, the resulting stick feel would vary over the anticipated flight regime. It is preferred for values of $N_z$ close to $+1$ $g$ that the $N_z$ force signal be added almost entirely to the spring strut force. However, for values of $N_z$ exceeding predetermined positive and negative limits, such as $+4$ $g$ and $-2$ $g$ for the F-8 aircraft, it is preferred that the resulting resistive force being applied to the stick be controlled more closely in accordance with a desired normal acceleration curve and that the spring strut force being provided be subtracted from the $N_z$ force which is then being commanded by the $N_z$ sensor 20. In this way the control stick 11 has a total resistive force applied thereto in high $g$ situations which accords with the desired curve such as curve B of FIG. 3 and is the sum of the forces imposed by the feel spring strut 18 and by the pneumatic force producer 24.

In order to obtain a properly scaled fluidic signal indicative of the degree of force being applied to the actuator rod 12 by the feel spring strut 18 for the existing deflection of the control stick 11, a device 30 is provided which includes a pivotally mounted cam 31 connected through a pivotally attached rod 32 to the rod 12 so that longitudinal deflection of the rod 12 from the null position in either direction effects a corresponding rotation of the cam 31 and its cam surfaces 31a. An L-shaped cam follower 33 has one of its ends urged against the cam surface 31a by a spring 34 and has the other of its ends connected to drive a rotatable probe member (not shown) of a fluidic position transducer 35.

A suitable fluidic transducer 35 is described in a copending application of Horace B. Welk et al., Ser. No. 668,971, filed Sept. 19, 1967, entitled "Fluidic Control System and Fluidic Position Transducer Therefor" and includes a probe (not shown) which is rotatably mounted across a wind tunnel element (not shown) connected to receive therethrough from one end a fluid flow of properly scaled constant magnitude. The probe has a pair of internal chambers communicating through peripherally spaced longitudinally extending slots with the interior of the wind tunnel element on the fluid flow confronting surface of the probe. As shown by Welk et al., a pressure differential exists as between the pressures in the internal chambers of the probe in accordance with the rotational orientation of the probe relative to the wind tunnel element. The camming surface 31a of the cam 31 is critically shaped in a manner well known in the art so that the pressure differential existing between the wind tunnel chambers appears to vary substantially in accordance with force-stick deflection curve A as modified by the dotted segment A' of the diagram of FIG. 2. The preloading of the control stick 11 by the feel spring strut 18 need not be taken into account in that the dotted segment A' which varies linearly from zero to the break points at about minus 0.2 inch and plus 0.3 inch is a sufficiently close approximation. Of course, it is contemplated that other devices than that particularly described may be utilized to provide the desired fluidic signal indicative of the force being imposed by the strut 18.

The fluidic output signal of the transducer 35 is applied through a variable gain fluidic device 36 to the fluidic summing amplifier 22 in opposition to the fluidic $N_z$ force signal from the fluidic amplifier 21. In order to control the gain of the device 36, the apparatus includes a regulated pressure supply 37 which is fed through a valve 38 which is responsive to normal acceleration for providing an inhibiting signal fed to control the variable gain device 36.

One suitable configuration (not shown) for the valve 38 includes a tubular container closed at its ends, positioned adjacent the aircraft center of gravity and having a pair of opposed bores extending through the walls thereof each communicating with a respective one of the pressure supply 37 and a control port of the device 36. Positioned for acceleration responsive reciprocation within the container is a spring or fluid pressure-centered cylindrical mass having a transverse bore which is registerable completely with the container bores when the mass is in centered position, the mass functioning to decrease the degree of communication between the container bores in accordance with the variation of the normal acceleration from $+1$ $g$ and to block such communication when the predetermined positive and negative break point values of normal acceleration are reached or exceeded.

For example, an appropriate valve 38 for an F-8 aircraft is designed to respond to provide a maximum signal in a $+1$ $g$ situation which signal decreases in magnitude to zero as $N_z$ varies from $+1$ $g$ to either $+4$ $g$ or $-2$ $g$. This signal is used to inhibit or change the gain of the device 36 so that the device 36 has a response approximating that indicated by a curve C in FIG. 4 which shows an example of the percentage of the fluidic signal from the transducer 35 which is passed by the device 36 in response to various $N_z$ conditions. The break points of $+4$ $g$ and $-2$ $g$ at which 100% of the transducer signal is passed to the summing amplifier 22 are selected as for the F-8 aircraft so that for any anticipated $N_z$ condition the output from the fluidic amplifier 21 will exceed in magnitude the output from the device 36. By this break point selection, the resulting output from the amplifier 22 will not tend to cause a sudden lessening of the force being imposed upon the stick 11 by the force producer 24.

FIG. 5 discloses a first modification of the apparatus of FIG. 1 which is responsive both to normal acceleration, $N_z$, and to pitching angular acceleration, $\ddot{\theta}$, for causing the force producer 24 to impose a deflection resisting force additional to that imposed by the feel spring strut 18. The added responsiveness to $\ddot{\theta}$ provides the pilot with an advance warning that a particular maneuver may cause the aircraft to be stressed beyond its structural limits by the succeeding acceleration forces. To this end a $\ddot{\theta}$ sensor 40 provides a linearly varying fluidic signal to a cascade of fluidic amplifiers 41 whose properly scaled output $\theta$ force signal is provided to a summing amplifier 42. A convenient rate of change of the scaled, amplified fluidic output of the $\theta$ sensor 40 for an F–8 aircraft is 7.9 lbs. sec.$^2$ per radian. The summing amplifier 42 adds the scaled output $\theta$ force signal to the scaled output $N_z$ force signal from a fluidic function generator 43 which, in turn, is controlled by the fluidic signal of the $N_z$ sensor 20 which has been amplified by the cascade of fluidic amplifiers 21. The resulting output force signal of the summing amplifier 42 is fed to the fluidic summing amplifier 22 in opposition to the signal from the device 36. The amplifier 22 functions, as above, to provide the producer 24 through the amplifier 23 with the force controlling input signal.

It has been found that the resultants of linear $N_z$ and $\theta$ force commands over the entire flight regime appear to command in some situations between $+1\frac{1}{2}$ g and $+3$ g an unsatisfactorily small increase in desired resistive force which would be imposed by the force producer 24. Therefore, it is preferred that the linear function provided by the $N_z$ sensor 20 through the amplifiers 21 be modified by the fluidic function generator 43 in order to provide a scaled output $N_z$ force signal which varies substantially in accordance with curve D of FIG. 3 wherein the rate of change of the output $N_z$ force signal is greater between a predetermined range such as $-1$ g to $+3$ g for an F–8 aircraft than is that of the signal approximating the curve B which is provided by the amplifiers 21 to the summing amplifier 22 in the apparatus of FIG. 1. The limits of the predetermined range and the slope of the desired curve D are selected for a particular aircraft in order to eliminate the above-described plateau and in order to enable a greater resistive force to be applied to the constrol stick 11 for an $N_z$ between $-2$ g and $+4$ g. For example, in the F–8 aircraft, 10 lbs. per g approximates a convenient rate of change for the output $N_z$ force signal between $-1$ and $+3$ g. Additionally, for positive accelerations above $+3$ g, about 5.9 lbs. per g and, for negative accelerations beyond $-1$ g, about 5 lbs. per g are convenient rates of change for the output $N_z$ force signal. The slopes for the higher positive and negative g conditions are selected to approach the maximum resistive force producible by the particular pneumatic force producer being used for the $N_z$ conditions at which the structural limits of the aircraft are reached. Suitable fluidic function generators for use as the generator 43 may be easily designed by persons skilled in the art using well known components such as fluidic amplifiers and fluidic flip-flops. By using the above-described apparatus, the above-indicated range of $N_z$ values wherein little additional force is imposed by the producer 24 is substantially eliminated, and more consistent results are achieved by the apparatus over the entire anticipated flight regime.

Since the rate of change of the $N_z$ force signal has been increased by the generator 43, the valve 38 of FIG. 1 may be modified so that the inhibit signal is reduced to zero at values of $+3$ g and $-1$ g for an F–8 aircraft so that the variable gain device 36 passes substantially 100% of the signal from the transducer 35 at those predetermined $N_z$ conditions as shown by the dotted curve C' of FIG. 4. Also, if a fluidic responsive force producer is available with an output capability of 60 lbs. instead of the 40 lbs. as shown in FIG. 3, the fluidic function generator 43 may be modified so that the upper portions of the curve D resemble the segments D'. The break points of about 30 lbs. at $+5$ g and about 26 lbs. at $-2$ g have been selected so that the pilot is not overworked since the usual $N_z$ conditions typically encountered range between $-2$ and $+5$ g's. Thereby, a more substantial warning is given to the pilot that the aircraft is beginning to be stressed to its structural limits.

FIG. 6 discloses a second modification of the apparatus of FIG. 1 which is responsive not only to $N_z$ and $\theta$ but also to pitching angular velocity, $\dot\theta$. This characteristic is desirable in that there will be additionally imposed resistance to stick deflection during times when the pitch attitude, $\theta$, of the aircraft is being changed, as when the aircraft is being aligned for landing or bringing weapons to bear upon targets. The apparatus includes a $\dot\theta$ sensor 50, well known in the art, which provides a fluidic signal preferably in differential pressure form and indicative of the existing pitching angular velocity condition. The fluidic signal therefrom is amplified by a cascade of fluidic amplifiers 51 and is applied to a fluidic function generator 52 simliar to the fluidic function generator 43 of the apparatus of FIG. 5. The generator 52 provides a fluidic output $\dot\theta$ force signal which is fed to a fluidic summing amplifier 53 along with the $\theta$ force signal from the amplifiers 41 and directed by the $\theta$ sensor 40 and the $N_z$ force signal from the generator 54 and directed by the $N_z$ sensor 20. The fluidic output $\dot\theta$ force signal provided by the generator 52 preferably varies in a manner shown by curve E of the force diagram of FIG. 7 wherein from small values of $\dot\theta$ centered about zero the resistive force desired increases toward certain predetermined positive and negative break points at, for example, $\pm5°$ per second beyond which points the desired force increases at a lesser rate. The resultant output force signal from the fluidic summing amplifier 53 representing the sum of all the force cues commanded by the sensors 20, 40 and 50 is fed to the summing amplifier 22 in opposition to the signal from the variable gain device 36 whose gain is inhibited by a fluidically controlled valve 55 and from which is provided a controlled proportion of the output signal from the transducer 35.

Increased values of $\dot\theta$ typically precede in time a resulting increased $N_z$ condition. Hence, it is preferred in the apparatus of FIG. 6 to make the valve 55 responsive to $\dot\theta$ rather than to $N_z$. To accomplish this, the valve 55 receives for its control a $\dot\theta$ indicating signal from the cascade of fluidic amplifiers 51 and functions to provide the variable gain device 36 with a maximum inhibit signal at a $\dot\theta$ of zero and with no inhibit signal at $\dot\theta$ values of $\pm5°$ per second. In this manner, the device 36 is enabled to pass an appropriate percentage of the signal from the transducer 35 approximating that indicated by the curve F of the diagram of FIG. 8. As indicated above, the break points of $\pm5°$ per second are chosen so that the resultant fluidic force signal being provided to the summing amplifier 22 by the amplifier 53 always exceeds that signal provided by the device 36 for combinations of conditions over the entire anticipated flight regime.

Since the apparatus is additionally responsive to $\dot\theta$, it is unnecessary that the apparatus be responsive to conditions of $N_z$ within the ranges of $-2$ g to $+5.5$ g. Hence, the fluidic function generator 54 of the apparatus of FIG. 6 is designed to provide an output $N_z$ force signal substantially in accordance with curve G of FIG. 3.

In this manner the additional resistive force commanded by the $N_z$ sensor 20 primarily serves as a warning to the pilot that the structural limits of the aircraft are being approached. At the same time, the increased resistive force commanded by the $\theta$ sensor 50 enables the pilot to more precisely bring weapons to bear upon a target. Additionally, the apparatus of FIG. 6 is somewhat responsive to aircraft velocity as is shown by the family H of curves of FIG. 9 which represent the resultant of the $N_z$ force and the $\dot\theta$ force signals over a range of aircraft linear velocities increasing from about .7 Mach to about 1.4 Mach, $\dot\theta$ being considered to be zero.

From the above, the invention provides an improved and simplified apparatus for providing deflection resisting forces which is more consistent over the entire anticipated flight regime. The improved system, further, enables the use of smaller force producers in that the total resistive force in high g situations approximates that commanded by the $N_z$ sensor 20 as modified by the function generators 43 or 54 since the degree of force produced by the feel spring strut 18 has been taken into account by the system. While it is preferred that fluidic devices be incorporated in the system of the invention because of their compact size, reliability and operability during an electrical power failure aboard the aircraft, it is contemplated that equivalent combinations of electrical or other components could be used. It is further contemplated that similar systems responsive to rolling angular acceleration and/or velocity and, thereby, adapted for resisting roll control stick deflections could be implemented.

I claim:

1. In an aircraft having a control stick, actuator means for positioning aircraft control surfaces and linkage means interconnecting the control stick with the actuator means, apparatus comprising:

first force producing means connected to the linkage means for providing resistance to deflection of the control stick from a null position;

second force producing means connected to the linkage means and responsive to a force input signal for providing additional resistance to deflection of the control stick;

first force cue sensor means connected to said first force producing means for providing a first sensor output signal indicative of the resistive force imposed by said first force producing means;

second force cue sensor means for providing a second sensor ouput signal indicative of resistive force to be imposed in response to normal acceleration of the aircraft; and force signal means connected to receive said first sensor and said second sensor output signals and responsive thereto for providing said force input signal to said second force producing means.

2. Apparatus according to claim 1 wherein said force signal means includes:

first signal processing means connected to receive said first sensor output signal and responsive to normal acceleration for providing a first processor output signal being a predetermined portion of said first sensor output signal; and first summing means connected to receive in opposition said first processor and said second sensor output signals and providing to said second force producing means said force input signal indicative of the difference between said opposed signals received.

3. Apparatus according to claim 2 wherein said first signal processing means includes:

inhibit means responsive to normal acceleration for providing an inhibit signal having a maximum value during a normal acceleration condition of one gravitational constant and declining to a minimum value at predetermined values of normal acceleration; and means connected to receive said first sensor output signal and said inhibit signal and responsive thereto for providing said first processor output signal having a minimum value when said inhibit signal has said maximum value and increasing to a maximum value with said inhibit signal decreasing to said minimum value therefor.

4. Apparatus according to claim 3 wherein said second sensor means includes:

means for sensing normal acceleration and providing a normal acceleration signal; and means for receiving said normal acceleration signal and providing said second sensor output signal varying linearly with said normal acceleration signal.

5. Apparatus according to claim 2 wherein:

said first sensor means provides said first sensor output signal having a first predetermined rate of change for control stick deflections within a first predetermined range and having lesser predetermined rates of change for deflections beyond said first predetermined range.

6. Apparatus according to claim 5 wherein:

said second force producing means is responsive to said force input signal in fluidic form for resisting control stick deflection;

said first and said second sensor means and said first signal processing means each provide respective fluidic signals; and said first summing means includes a fluidic summing amplifier means for providing said force input signal to said second force producing means.

7. Apparatus according to claim 6 wherein said first sensor means comprises:

cam means connected to the linkage means; and fluidic position transducer means responsive to said cam means for providing said first sensor output signal in fluidic form to said first signal processing means.

8. Apparatus according to claim 2 further comprising:

third force cue sensor means for providing a third sensor output signal indicative of resistive force to be imposed in response to angular acceleration of the aircraft; and second summing means connected to receive said second and said third sensor output signals for adding same and providing a second summing output signal fed to said first summing means in opposition to said first processor output signal.

9. Apparatus according to claim 8 wherein said second sensor means includes:

means for sensing normal acceleration and providing a normal acceleration signal; and first function generator means connected to receive said normal acceleration signal and responsive thereto for providing said second sensor output signal having a predetermined rate of change for accelerations within a first predetermined range and having lesser second predetermined rates of change for accelerations beyond said first predetermined range.

10. Apparatus according to claim 9 wherein:

said first function generator means further provides said second sensor output signal having third predetermined rates of change greater than said second predetermined rates of change for accelerations beyond a second predetermined range encompassing and greater than said first predetermined range.

11. Apparatus according to claim 9 wherein:

said first function generator means provides said second sensor output signal in fluidic form;

said third sensor means provides said third sensor output signal in fluidic form varying linearly with the angular acceleration of the aircraft;

said first sensor means includes cam means connected to the linkage means and fluidic position transducer means responsive to said cam means for providing to said first signal processing means said first sensor output signal in fluidic form having a first predetermined rate of change for control stick deflections within a first predetermined range and having lesser predetermined rates of change for stick deflections beyond said first predetermined range;

said first signal processing means provides said first sensor output signal in fluidic form having a value not greater than that of said second summing output signal; and said first summing means provides said force input signal in fluidic form, and said second force producing means is responsive to said fluidic force input signal.

12. Apparatus according to claim 1 wherein said apparatus further comprises:

third force cue sensor means for providing a third sensor output signal indicative of resistive force to be imposed in response to angular velocity of the aircraft; and wherein said force means includes:

signal processing means connected to receive said first sensor output signal and responsive to angular velocity for providing a processor output signal being a predetermined portion of said first sensor output signal;

first summing means connected to receive said second and said third sensor output signals for adding same for providing a first summing output signal; and second summing means connected to receive in opposition said processor and said first summing output signals for providing to said second force producing means said force input signal indicative of the difference between said opposed signals received.

13. Apparatus according to claim 12 wherein said third force cue sensor means includes:

means for sensing angular velocity and providing an angular velocity signal; and first function generator means connected to receive said angular velocity signal and responsive thereto for providing to said first summing means said third sensor output signal having a first predetermined rate of change for angular velocities within a first predetermined range and having lesser second predetermined rates of change for angular velocities beyond said first predetermined range.

14. Apparatus according to claim 13 wherein said second force cue sensor means includes:

means for sensing normal acceleration and providing a normal acceleration signal; and second function generator means connected to receive said normal acceleration signal and responsive thereto for providing to said first summing means said second sensor output signal having first predetermined rates of changes for accelerations beyond a first predetermined range.

15. Apparatus according to claim 14 further comprising:

fourth force cue sensor means connected to said first summing means for providing thereto a fourth sensor output signal indicative of resistive force to be imposed in response to angular acceleration of the aircraft;

said first summing means adding said second, said third and said fourth sensor output signal for providing said first summing output signal.

16. Apparatus according to claim 15 wherein:

said second force producing means is responsive to said force input signal in fluidic form for resisting control stick deflection;

said second, said third and said fourth sensor means and said signal processing means each provide respective fluidic signals;

said first and second summing means each comprise fluidic summing signal means for providing said respective output signals in fluidic form; and said first sensor means includes cam means connected to the linkage means and fluidic position transducer means responsive to said cam means for providing said first sensor output signal in fluidic form to said signal processing means.

17. Apparatus according to claim 16 wherein said signal processing means includes:

inhibit means connected to receive said angular velocity signal and connected to a regulated pressure supply for providing an inhibit signal having a maximum value at zero angular velocity and having a minimum value at predetermined values of positive and negative angular velocities; and means connected to receive said first sensor output signal and said inhibit signal and responsive to said inhibit signal for providing said processor output signal having a minimum value when said inhibit signal has said maximum and increasing to a maximum value as said inhibit signal decreases to said minimum value.

References Cited

UNITED STATES PATENTS

| | | | |
|---|---|---|---|
| 2,630,284 | 3/1953 | Feeney | 244—83 |
| 2,944,770 | 7/1960 | Patin et al. | 244—83 |
| 3,002,714 | 10/1961 | Decker | 244—83 |
| 3,042,343 | 7/1962 | Cooke et al. | 244—76 |
| 3,399,849 | 9/1968 | Hendrick | 244—77 |

FERGUS S. MIDDLETON, Primary Examiner

U.S. Cl. X.R.

244—76, 78, 83